United States Patent [19]
Williamson

[11] Patent Number: 5,926,645
[45] Date of Patent: Jul. 20, 1999

[54] METHOD AND SYSTEM FOR ENABLING MULTIPLE STORE INSTRUCTION COMPLETIONS IN A PROCESSING SYSTEM

[75] Inventor: Barry Duane Williamson, Round Rock, Tex.

[73] Assignee: International Business Machines Corporation, Armonk, N.Y.

[21] Appl. No.: 08/898,359

[22] Filed: Jul. 22, 1997

[51] Int. Cl.[6] .............................. G06F 9/06; G06F 9/312; G06F 9/305
[52] U.S. Cl. .................... 395/800.23; 395/564; 395/582; 395/391
[58] Field of Search ............................... 395/309, 185.03, 395/185.04, 874, 800.23, 873, 864, 875, 821, 200.64, 200.61, 187.03, 582, 598; 711/213, 133, 122; 364/DIG. 1, DIG. 2

[56] References Cited

U.S. PATENT DOCUMENTS

| | | | |
|---|---|---|---|
| 5,023,776 | 6/1991 | Gregor | 364/200 |
| 5,155,831 | 10/1992 | Emma et al. | 395/425 |
| 5,442,766 | 8/1995 | Chu et al. | 395/414 |
| 5,450,564 | 9/1995 | Hassler et al. | 395/495 |
| 5,463,741 | 10/1995 | Levenstein | 395/299 |
| 5,548,735 | 8/1996 | Chen et al. | 395/375 |
| 5,590,379 | 12/1996 | Hassler et al. | 395/851 |
| 5,592,684 | 1/1997 | Gaskins et al. | 395/872 |
| 5,611,063 | 3/1997 | Loper et al. | 395/381 |

OTHER PUBLICATIONS

"Gathering Store Instructions In A Superscalar Processor," *IBM Technical Disclosure Bulletin*, vol. 39, No. 09, 103–105 (Sep. 1996).

*Primary Examiner*—Daniel H. Pan
*Attorney, Agent, or Firm*—Sawyer & Associates; Anthony V. S. England

[57] ABSTRACT

A method and system for a handling multiple store instruction completions in a processing system after a stall condition is disclosed. The processing system includes an instruction unit, the instruction unit including a dispatch unit and a completion unit, a translation unit and at least one execution unit. A load store unit comprises an instruction queue for receiving a plurality of instructions from the dispatch unit; at least one effective address (EA) unit for receiving the plurality of instructions from the instruction queue, and a store queue. The store queue is coupled to the translation unit, the at least one execution unit and the at least one EA unit. The store queue receives data and real address information relating to each of the plurality of instructions from the at least one execution unit prior to completion of each of the plurality of instructions. In so doing, the bottleneck associated with conventional systems, i.e., a maximum number of instructions that can be dispatched by the instruction unit is reduced.

10 Claims, 11 Drawing Sheets

METHOD AND SYSTEM FOR ENABLING MULTIPLE STORE INSTRUCTION COMPLETIONS IN A PROCESSING SYSTEM

FIELD OF THE INVENTION

The present invention relates generally to a processing system and more particularly to provide multiple store instruction completions in a processing system.

BACKGROUND OF THE INVENTION

In the continuing development of faster and more powerful computer systems, a significant microprocessor has been utilized, known as a reduced instruction set computer (RISC) processor. Increased advances in the field of RISC processors have led to the development of superscalar processors. Superscalar processors, as their name implies, perform functions not commonly found in traditional scalar microprocessors. Included in these functions is the ability to execute instructions out-of-order with respect to the program order. Although the instructions occur out-of-order, the results of the executions appear to have occurred in program order, so that proper data coherency is maintained.

A common bottleneck in superscalar processor performance is the number of instructions which can be outstanding within the processor at a given time. Typically, the instruction unit includes a queue which indicates the number of outstanding instructions. The queue typically suspends any future dispatching of instructions if a maximum number is reached.

One type of instruction which can be slow to complete is the store instruction. A store instruction is slow to complete for a number of reasons. For example, store instructions are slow to complete due to the maximum number of stores which can be completed per cycle, and due to the number of stores which can update the cache each cycle. Conventional superscalar processors typically only complete one store instruction per cycle. This oftentimes causes dispatch stalls. Accordingly, a need exists for a system that efficiently and effectively combats such problems and decreases the number of dispatch unit stalls due to the lack of store instructions completions to enhance overall processor performance.

SUMMARY OF THE INVENTION

Accordingly, the present invention is directed to increasing the number of store instructions that can be completed during a cycle. A method and system for handling multiple store instruction completions in a processing system after a stall condition is disclosed. The processing system includes an instruction unit, the instruction unit including a dispatch unit and a completion unit, a translation unit and at least one execution unit. A load store unit comprises an instruction queue for receiving a plurality of instructions from the dispatch unit; at least one effective address (EA) unit for receiving the plurality of instructions from the instruction queue, and a store queue. The store queue is coupled to the translation unit, the at least one execution unit and the at least one EA unit. The store queue receives data and real address information relating to each of the plurality of instructions from the at least one execution unit prior to completion of each of the plurality of instructions.

In so doing, the bottleneck associated with conventional systems, i.e., a maximum number of instructions that can be dispatched by the instruction unit is reduced.

These and other advantages of the aspects of the present invention will be more fully understood in conjunction with the following detailed description and accompanying drawings.

DETAILED DESCRIPTION

The present invention relates to increasing the number of store instructions that can be completed in a superscalar processor to reduce dispatch stalls. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1:
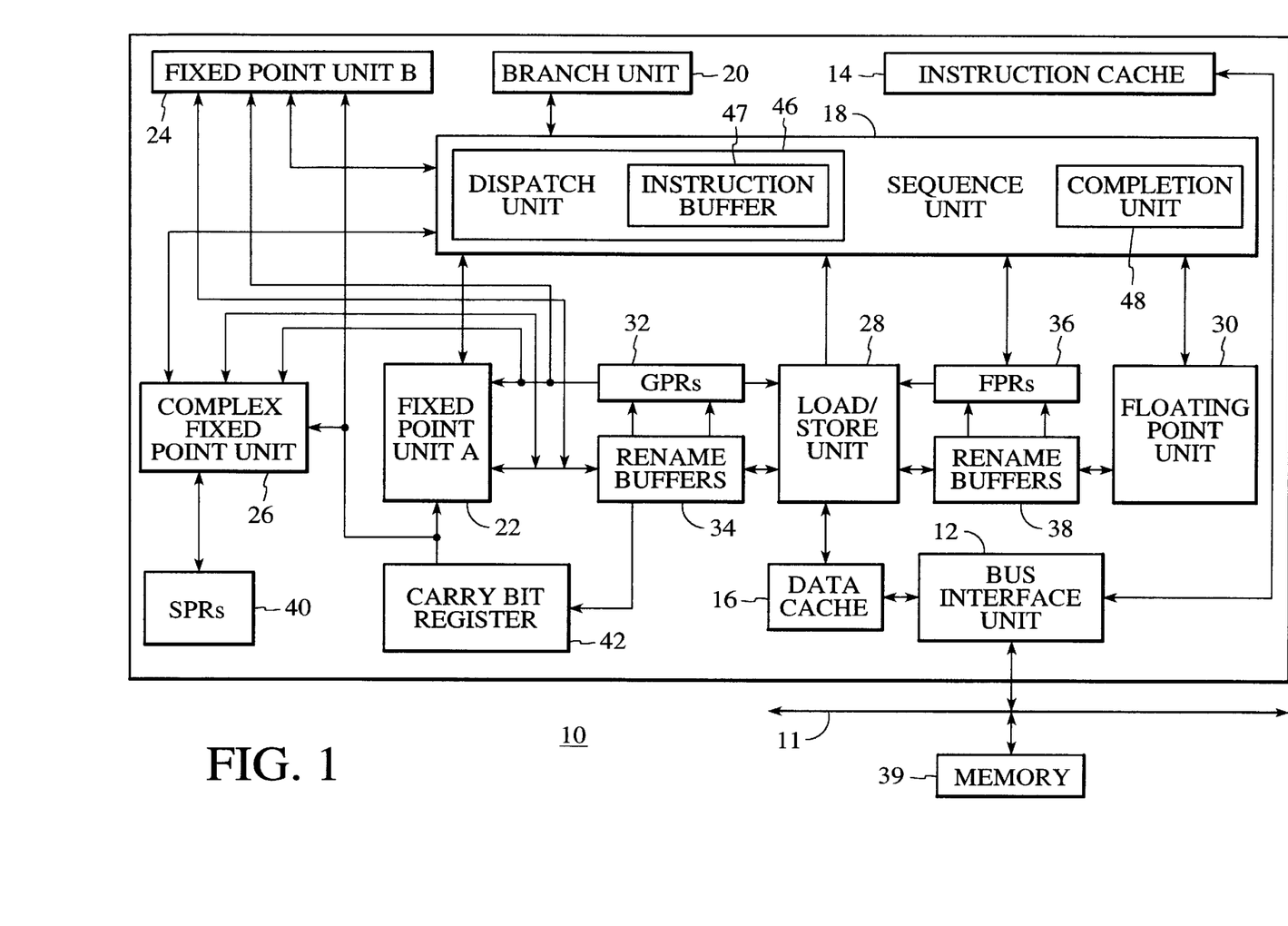
FIG. 1 illustrates a block diagram of a computer system in accordance with the present invention.

FIG. 1 is a block diagram of a processor system 10 for processing information in accordance with the present invention. In the preferred embodiment, processor 10 is a single integrated circuit superscalar microprocessor, such as the PowerPC™ processor from IBM Corporation, Austin, Tex. Accordingly, as discussed further hereinbelow, processor 10 includes various units, registers, buffers, memories, and other sections, all of which are formed by integrated circuitry. Also, in the preferred embodiment, processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46 and a completion unit 48, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42. FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches through a dispatch unit 46 the instructions to selected ones of execution units 20, 22, 24, 26, 28 and 30. Each execution unit executes one or more instructions of a particular class of instructions. For example, FXUA 22 and FXUB 24 execute a first class of fixed point mathematical operations on source operands, such as addition, subtraction, ANDing, Oring and XORing. CFXU 26 executes a second class of fixed point operations on source operands, such as fixed point multiplication and division. FPU 30 executes floating point operations on source operands, such as floating point multiplication and division.

Processor 10 achieves high performance by processing multiple instructions simultaneously at various ones of execution units 20, 22, 24, 26, 28 and 30. Accordingly, each instruction is processed as a sequence of stages, each being executable in parallel with stages of other instructions. Such a technique is called "pipelining". In a significant aspect of the preferred embodiment, an instruction is normally processed as six stages, namely fetch, decode, dispatch, execute, completion, and writeback.

In the preferred embodiment, each instruction requires one machine cycle to complete each of the stages of instruction processing. Nevertheless, some instructions (e.g., complex fixed point instructions executed by CFXU 26) may require more than one cycle. Accordingly, a variable delay may occur between a particular instruction's execution and completion stages in response to the variation in time required for completion of preceding instructions.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16 or memory.

As an example of the interaction among the execution units, e.g., FXUA 22, FXUB 24, rename buffers 34, and the dispatch unit 46, an instruction "add c,a,b" is dispatched from the dispatch unit 46 to the FXUA 22. The dispatch unit 46 provides the FXUA 22 with tags for the operands "a" and "b" to tell the FXUA 22 where to retrieve the data for the operands, as is well understood by those skilled in the art. For example, in a system with six rename buffers, the dispatch unit 46 might suitably tag the operand for "a" as being located in a rename buffer 1 with a six bit tag 100000. A tag of 010000 might then suitably be used to indicate that the operand "b" is in the rename buffer 2. Since the FXUA 22 does not write into GPRs 32, the dispatch unit 46 must use a rename buffer tag for the target of the operation, such as 001000, for the result of the 'add' instruction to be placed in rename buffer 3.

As before mentioned, one of the problems with the prior art system is that only one store instruction can be completed in one cycle. To illustrate this problem in a conventional system refer now to FIG. 2 in conjunction with the accompanying description.

Figure 2:
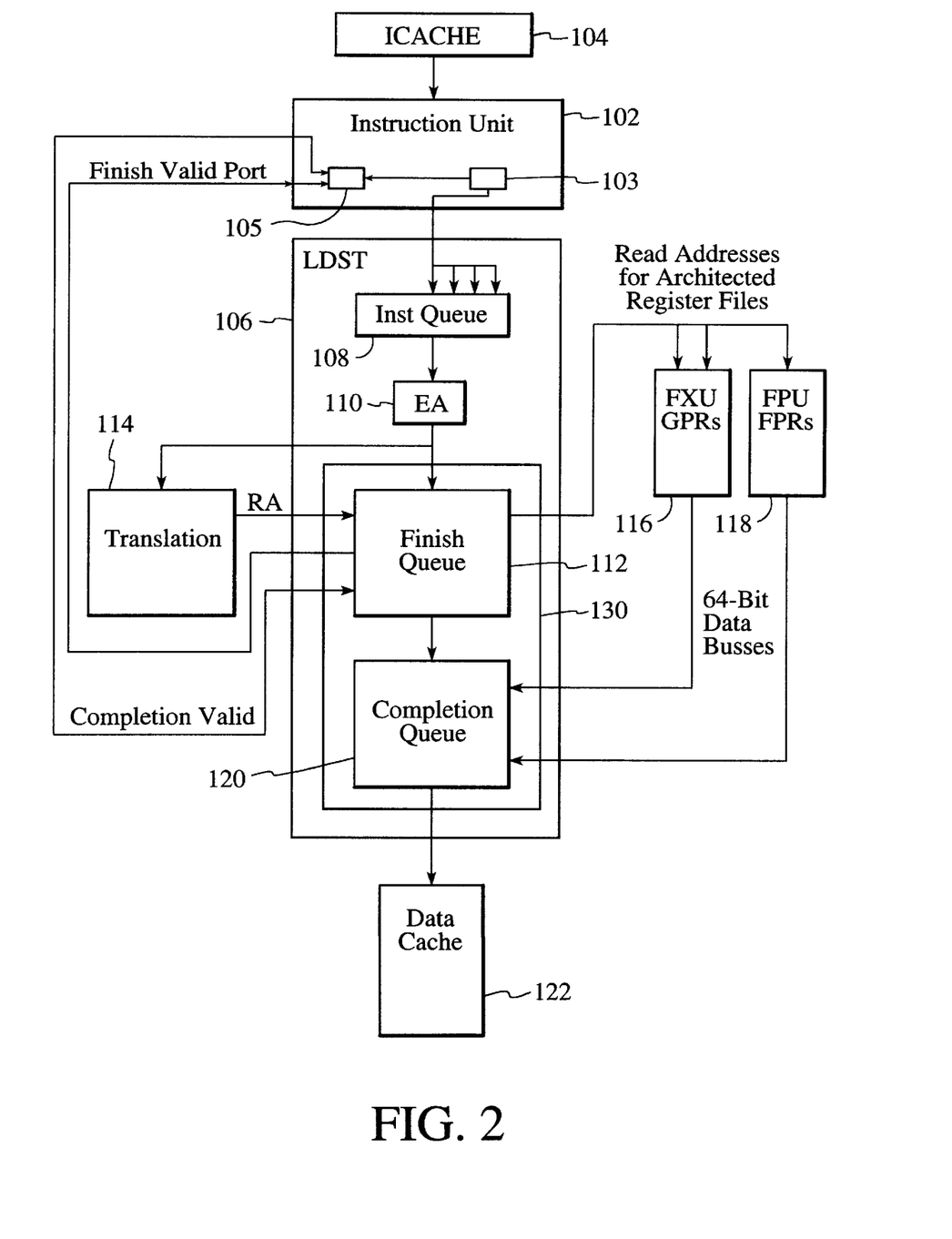
FIG. 2 is a conventional system for completing store instructions in a processing system.

FIG. 2 is a conventional system for completing store instructions in a processing system. In this embodiment, the instruction unit 102 includes a dispatch unit 103 and a completion unit 105. The instruction unit 102 receives instructions from an instruction cache 104 in the dispatch unit 103. The dispatch unit 103 then provides the store instruction received from the instruction cache to the Load/Store (LDST) unit 106. The dispatch unit 103 also sends the store instruction to the completion unit 105. If there are previous instructions within LDST 106, the store instruction is provided to an instruction queue 108. If there are no previous instructions within the LDST 106, then the instruction queue 108 is bypassed and the store instruction can be provided directly to an effective address (EA) unit 110. In either case, the EA unit 110 then receives the address information for a particular instruction.

The control information of the effective address is provided to a finish queue (FQ) 112 of the store queue 130, while information about the address is provided to the translation unit 114. The translation unit 114 translates EA information into a real address (RA) and provides the RA to the FQ 112. The FQ 112 then provides a finish valid signal to the completion unit 105. The completion unit 105 then provides a complete valid signal to the FQ 112. The FQ 112 then sends addresses into the fixed unit (FXU) 116 and floating point unit (FPU) 118. The FXU and FPU then provide data related to those addresses to completion queue (CQ) 120. The FQ 112 also provides the RA information to the CQ 120. The CQ 120 can then provide the store instruction to the data cache 122.

Figure 3A:
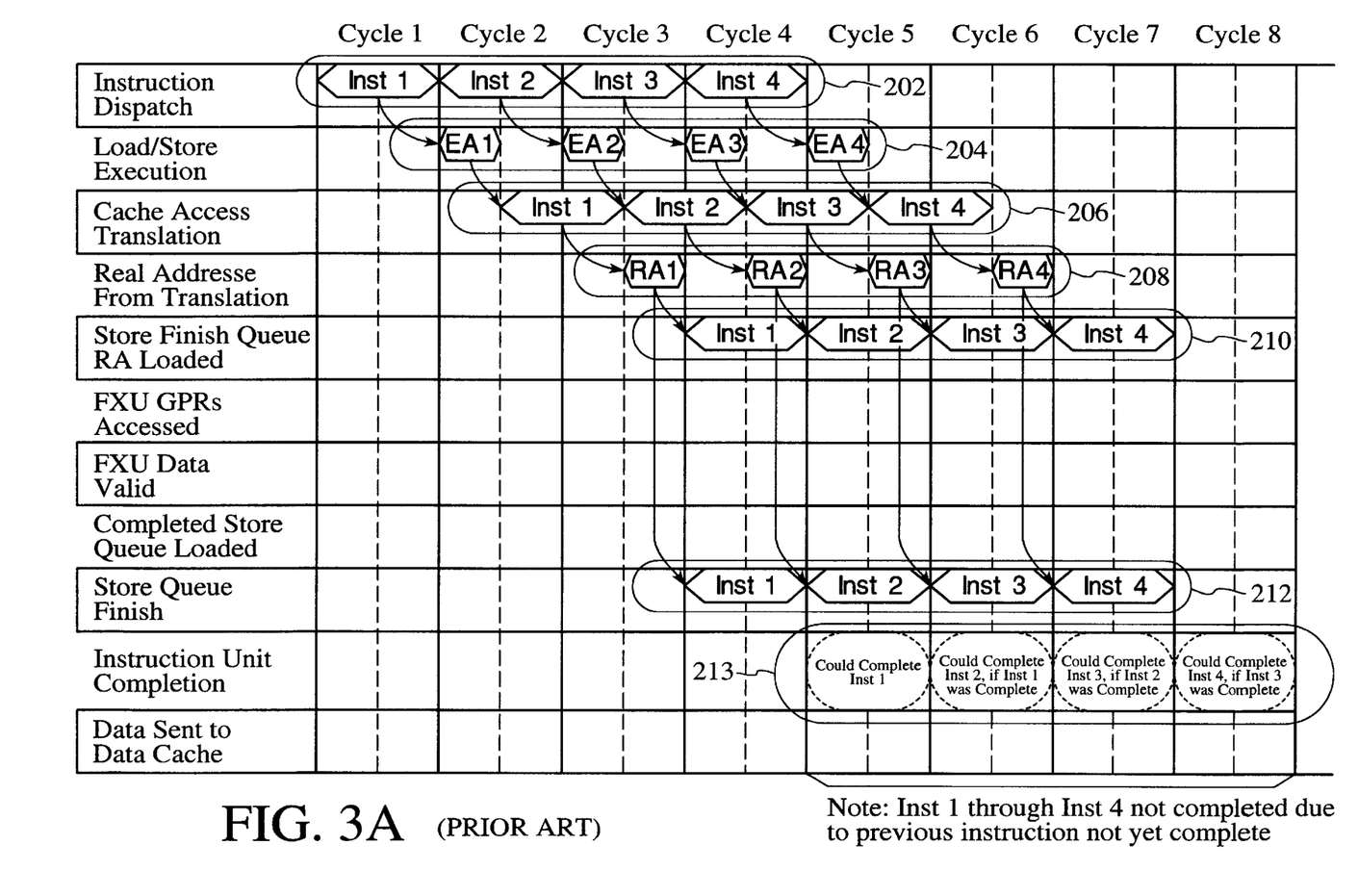
FIG. 3 is a timing diagram which illustrates the operation of the data flow of FIG. 2.
Figure 3B:
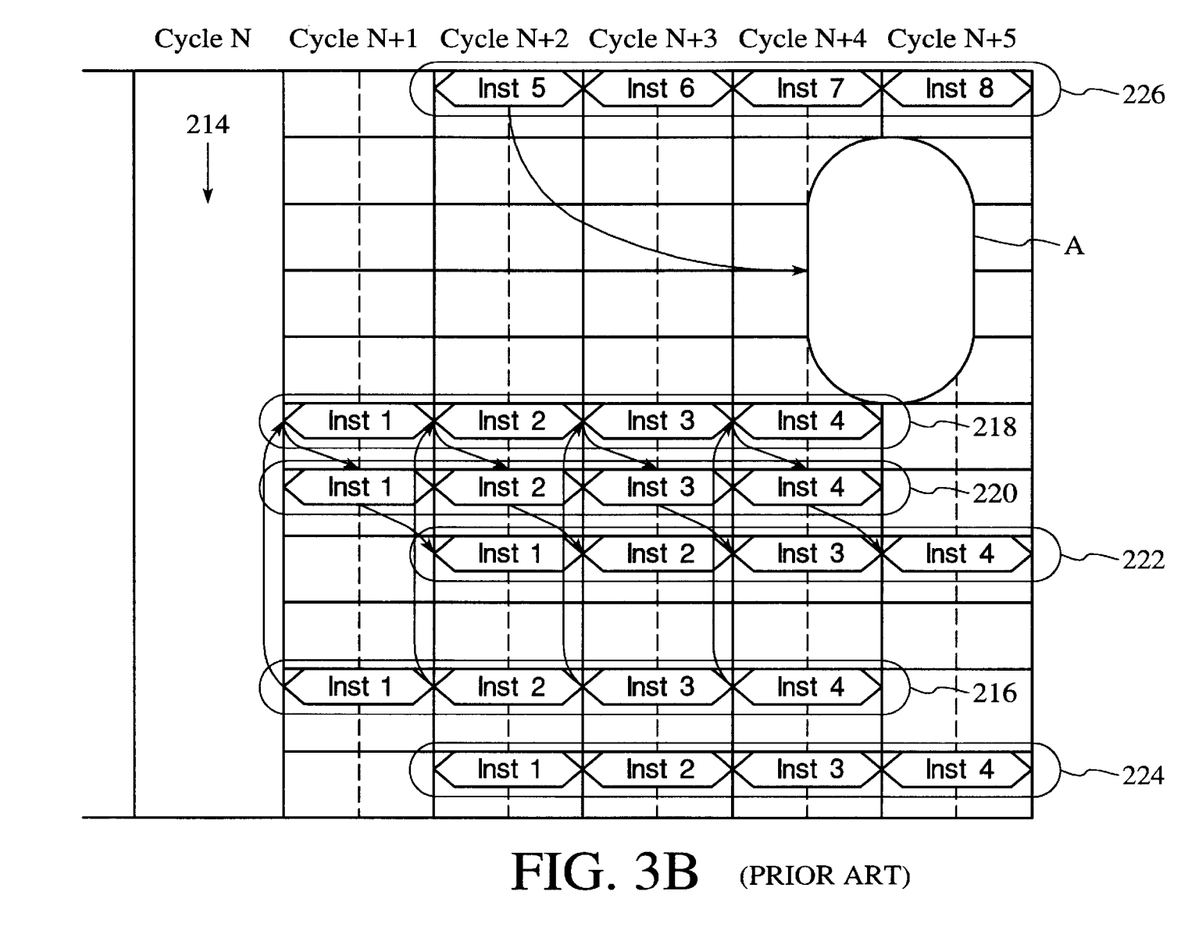

Referring now to FIG. 3, what is shown is a timing diagram of the data flow for a plurality of store instructions 1–4 of the fixed execution (FXD) unit 116. In this embodiment, shown generally at 202, as is seen instruction 1 is dispatched in cycle 1, instruction 2 is dispatched in cycle 2, instruction 3 is dispatched in cycle 3, and instruction 4 is dispatched in cycle 4. Thereafter, shown generally at 204, the LDST unit 106 executes the effective address of the instruction 1 (EA1) in the first half of cycle 2, the effective address of instruction 2 (EA2) in the first half of cycle 3, the effective address of instruction 3 (EA3) in the first half of cycle 4 and the effective address of instruction 4 (EA4) in the first half of cycle 5. The accessing of translated addresses of instructions 1–4 is shown generally at 206. The accessing of the address of instruction 1 between the second half of cycle 2 and the first half of cycle 3, on instruction 2 between the second half of cycle 3 and the first half of cycle 4, on instruction 3 between the second half of cycle 4 and the first half of cycle 5, and on the address of instruction 4 between the second half of cycle 5 and the first half of cycle 6.

The real addresses are then provided from the translation unit, shown generally at 208. The real address of instruction 1 (RA1) is provided during the second half of cycle 3, the real address of instruction 2 (RA2) is provided during the second half of cycle 4, the real address of instruction 3 (RA3) is provided during the second half of cycle 5 and the real address of instruction 4 (RA4) is provided during the second half of cycle 6.

In this embodiment, the finish queue as before-mentioned is loaded with real address values for instructions 1–4 during cycles 4–7, respectively, which is shown generally at 210. The instructions 1–4 can finish at cycles 4–7, shown generally at 212. Instructions 1–4 even if they could be completed, there is a dependency among the instructions which limits the performance of the processor, shown generally at 213. That is, instruction 1 could be completed at cycle 5, instruction 2 could only be completed at cycle 6 if instruction 1 is completed, instruction 3 could only be completed at cycle 7 if instructions 1 and 2 are completed. Finally, instruction 4 can be completed only if instructions 1–3 have been completed at cycle B.

After a stall condition shown generally at 214 and if the instruction completion unit is full, beginning at cycle n+1, then instructions 1–4, shown generally at 216, can be completed one at a time. This is accomplished through the completion unit 105 initiating a completion signal for instructions 1–4 during cycles n+1 to cycle n+4 respectively. Hence, the fixed unit general purpose registers (GPRs) may be accessed to obtain data for instructions 1–4 from cycle n+1 to cycle n+4 respectively shown generally at 218. The data valid signal for each of the instructions are also provided from cycle n+1 to cycle n+4 respectively, shown generally at 220.

Thereafter, the completed store queue is loaded with instructions 1–4, shown generally at 222. Instruction 1 is loaded in the completed store queue at cycle n+2. Instruction 2 is loaded in the completed store queue at cycle n+3. Instruction 3 is loaded into the completed store queue at cycle n+4. Instruction 4 is loaded into the completed store queue at cycle n+5. The data for instructions 1–4 are then sent one instruction at a time to the data cache during cycles n+2 to cycle n+5 in the instruction unit respectively, shown generally at 224.

If the processor had reached its limit as to the maximum number of outstanding instructions, then in cycle N+2 only 1 instruction can be dispatched. This also applies to cycles N+3 through N+6. Accordingly, instructions 5–8 generally shown at 226, have to be dispatched sequentially because the completion unit is full. Accordingly, this penalty in dispatch time affects the overall performance of the processor.

The problem with this data flow is that due to the above-described finish queue/completion queue interaction, the dispatching of instructions is significantly delayed if a dispatch stall occurs where the completion unit 105 is full. A conventional approach to overcoming this problem is to add additional ports on the execution units. This approach adds additional expense and complexity to the system. Accordingly, what is needed is a method and system for improving the overall performance of a processor by completing multiple store instructions after a dispatch stall has occurred that is simpler than known approaches.

A system and method illustrated in accordance with the present invention substantially improves the performance of a processor by completing multiple store instructions after a stall condition occurs and the completion buffer is full. In the present invention, the store queue is a single queue rather than being a combination of a finish queue and complete queue. In addition, the data related to a store instruction is accessed prior to the completion of instruction rather than after completion. The store instruction can then be finished when either of the following two conditions are met, the real address (RA) and data is loaded in the store queue, or the RA is loaded in the store queue and the data is being sent to the store queue. By accessing the data earlier, multiple store instructions can be completed substantially simultaneously. Accordingly, multiple instructions can be dispatched after a dispatch stall when the completion buffer is full. In so doing, a system is provided which enables a plurality of store instructions to be completed simultaneously and thereby substantially reducing instruction dispatch delays by freeing up entries in the completion buffer.

Figure 4:
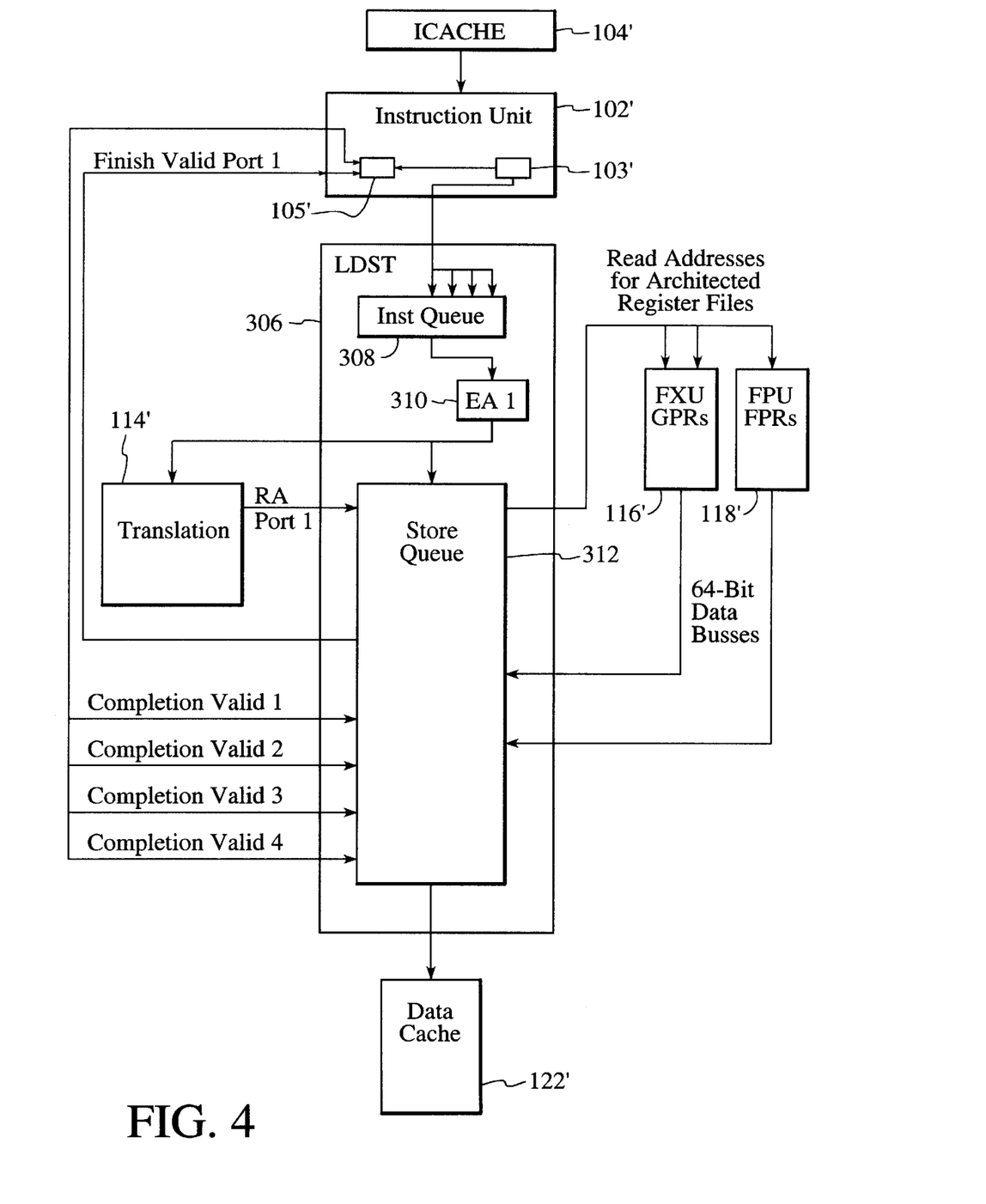
FIG. 4 is a diagram that illustrates a first embodiment of the data flow for completing a plurality of store instructions in accordance with the present invention.

The following discussion will more particularly describe the present invention. FIG. 4 is a first embodiment of a store instruction data flow which provides a single store instruction execution per cycle in accordance with the present invention. There are several elements similar to those elements shown in FIG. 2. These elements have been given similar designations to those of FIG. 2. However there are some critical differences. The first is that the store queue 312 of the Load/Store unit 306 is a single queue rather than a combination of a finish queue and completion queue. In this arrangement, the completion unit 105 completes the store instructions and the store queue 312 marks the appropriate entries when completed. In a preferred embodiment, the store queue 312 is 16 entries deep. That is, 16 store instructions can be stored in the store queue. Also, in a preferred embodiment, a bit within each entry is made active based upon the completion signal from the instruction unit. In addition, the operation of this dataflow is different from that described with respect to the store instruction dataflow of FIG. 2. As described above, data is accessed prior to completion of the store instruction. The store instruction is finished when one of two conditions are met: (1) either the real address and data are loaded in the store queue, or (2) the real address is loaded in the store queue and the data is being sent to the store queue.

Figure 5:
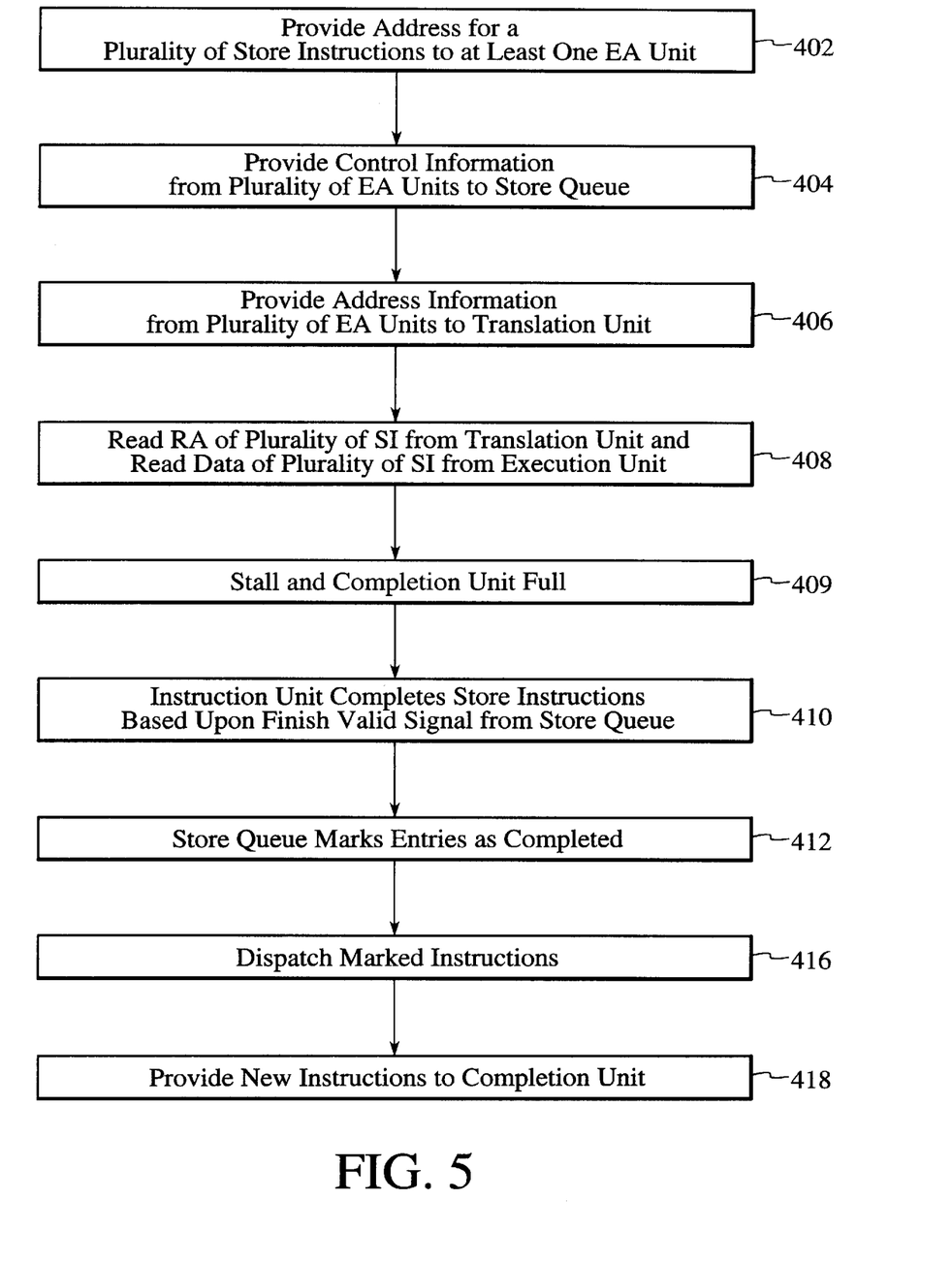
FIG. 5 is a flow chart illustrating the data flow for completing store instructions in accordance with the present invention.

To more particularly describe these differences, refer now to FIG. 5 which is a flow chart which generally illustrates the operation of the data flow of FIG. 4.

Firstly, a plurality of store instructions are provided to effective address EA unit 310 within Load/Store unit 306 from the dispatch unit 103', via step 402. The EA unit 310 provide control information to the store queue 312, via step 404. The EA unit 310 provides address information to the translation unit 114', via step 406. The real addresses (RA) related to the plurality of store instructions are read from the translation unit 114' and data related to the plurality of store instructions are read from the FXU unit 116', via step 408. After a dispatch stall occurs, the completion unit is full, via step 409.

The completion unit 105' completes the plurality of store instructions within its completion window based upon a finish valid signal received from the store queue 312, via step 410. The store queue marks its entries as completed, via step 412. Thereafter, the same number of new instructions can be dispatched from the dispatch unit 105, via step 416, and provided to the completion unit 105', via step 418. In so doing, dispatch stalls are greatly reduced by the present invention.

Figure 6A:
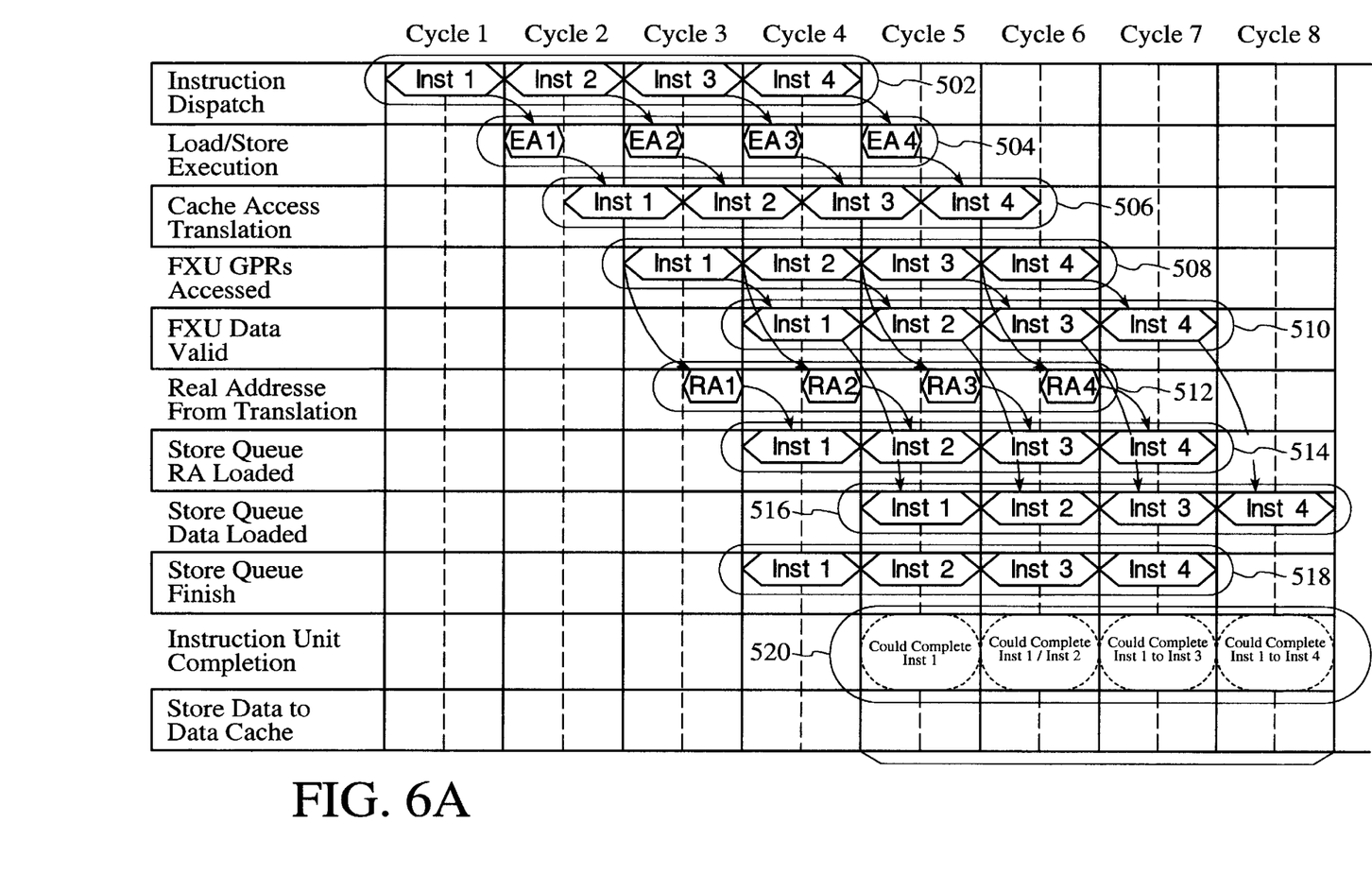
FIG. 6 is a timing diagram which illustrates the operation of the data flow of FIG. 4.
Figure 6B:
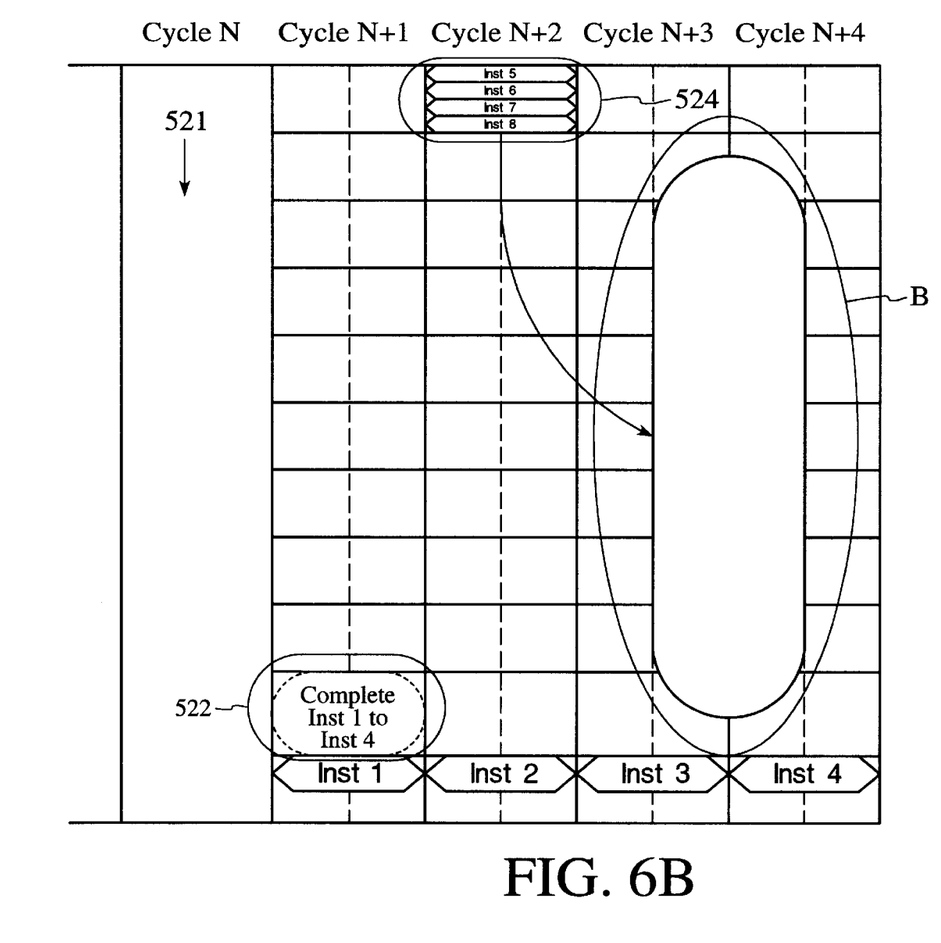

To more particularly explain the operation of the present invention and to contrast it with the timing diagram of a data flow of FIG. 2, refer now to FIG. 6 in conjunction with FIG. 3. FIG. 6 is a timing diagram of the dataflow of FIG. 4. In the embodiment of FIG. 6, as shown generally at 502, an instruction 1 is dispatched in cycle 1, instruction 2 is dispatched in cycle 3, and instruction 4 is dispatched in cycle 4 in a manner similar to 202 of FIG. 3. Thereafter, similar to that shown at 204 of FIG. 3, the loadstore unit executes the effective address of the instruction 1 (EA1) in the first half of cycle 2, the effective address of instruction 2 (EA2) in the first half of cycle 3, the effective address of instruction 3 (EA3) in the first half of cycle 4 and the effective address of instruction 4 (EA4) in the first half of cycle 5, shown generally at 504 of FIG. 6.

Thereafter, the cache translation access for translation of instructions 1–4 occurs in a manner similar to that shown at 206 of FIG. 3. The accessing the cache for the translated address of instruction 1 occurs between the second half of cycle 2 and the first half of cycle 3, accessing the cache for the translated address of instruction 2 occurs between the second half of cycle 3 and the first half of cycle 4, accessing the cache for the translated address of instruction 3 occurs between the second half of cycle 4 and the first half of cycle 5, and accessing the cache for the translated address of instruction 4 occurs between the second half of cycle 5 and the first half of cycle 6 as shown generally at 506 of FIG. 6.

In contrast to FIG. 3, however, next, the architected register files (GPRs) are accessed, shown generally at 508. The data for instruction 1 is accessed at cycle 3, then the data for instruction 2 is accessed at cycle 4, the data for instruction 3 is accessed at cycle 5, and the data for instruction 4 is accessed at cycle 6.

Next, the data for real addresses (RA1–RA4) are provided from translation unit and data valid signal is provided from the FXU 116' to the store queue 312 shown generally at 510 and 512, respectively. In this embodiment, the data valid signal for instruction 1 is provided during cycle 4, the data valid signal for instruction 2 is provided during cycle 5, the data valid signal for instruction 3 is provided during cycle 6 and the data valid signal for instruction 4 is provided during cycle 7. RA1 is provided during the second half of cycle 3, RA2 is provided during the second half of cycle 4, RA3 is provided during the second half of cycle 5, and RA4 is provided during the second half of cycle 6.

In this embodiment, the store queue 312 is loaded with real address values for instructions 1–4 during cycles 4–7, respectively, shown generally at 514. The store queue finish for each of the instructions 1–4 takes place during the same cycles that the store real addresses are loaded in the store queue, shown generally at 518, and the FXU 116' data valid signal is provided, shown generally at 510. Accordingly, the store queue finish can occur if one of two conditions are met: $^1$) either the RA and data are loaded in the store queue for the instructions 1–4, or $^2$) the RA are loaded and the data is being transferred into the store queue for instructions 1–4. Next, the data for instructions 1–4 is loaded into the store queue 312 if it is available, during cycles 5–8, respectively, shown generally at 516.

After the stall condition, shown generally at 521, the four instructions can be completed simultaneously, shown at 522. This is in contrast to the system of FIG. 3, where the four instructions must be completed sequentially. The completion unit 105' then initiates a completion signal for instructions 1–4 during cycle n+1. Also, since all the instructions have been marked as completed, the dispatch unit 103' can dispatch instructions 5–8 at the same time (cycle n+2) shown generally at 524.

If the processor had reached its limit as to the maximum number of outstanding instructions per cycle N+2 this implementation allows up to 4 instructions per cycle to be dispatched in cycle N+2, whereas the prior art implementation would only be allowed to dispatch one instruction.

Figure 7:
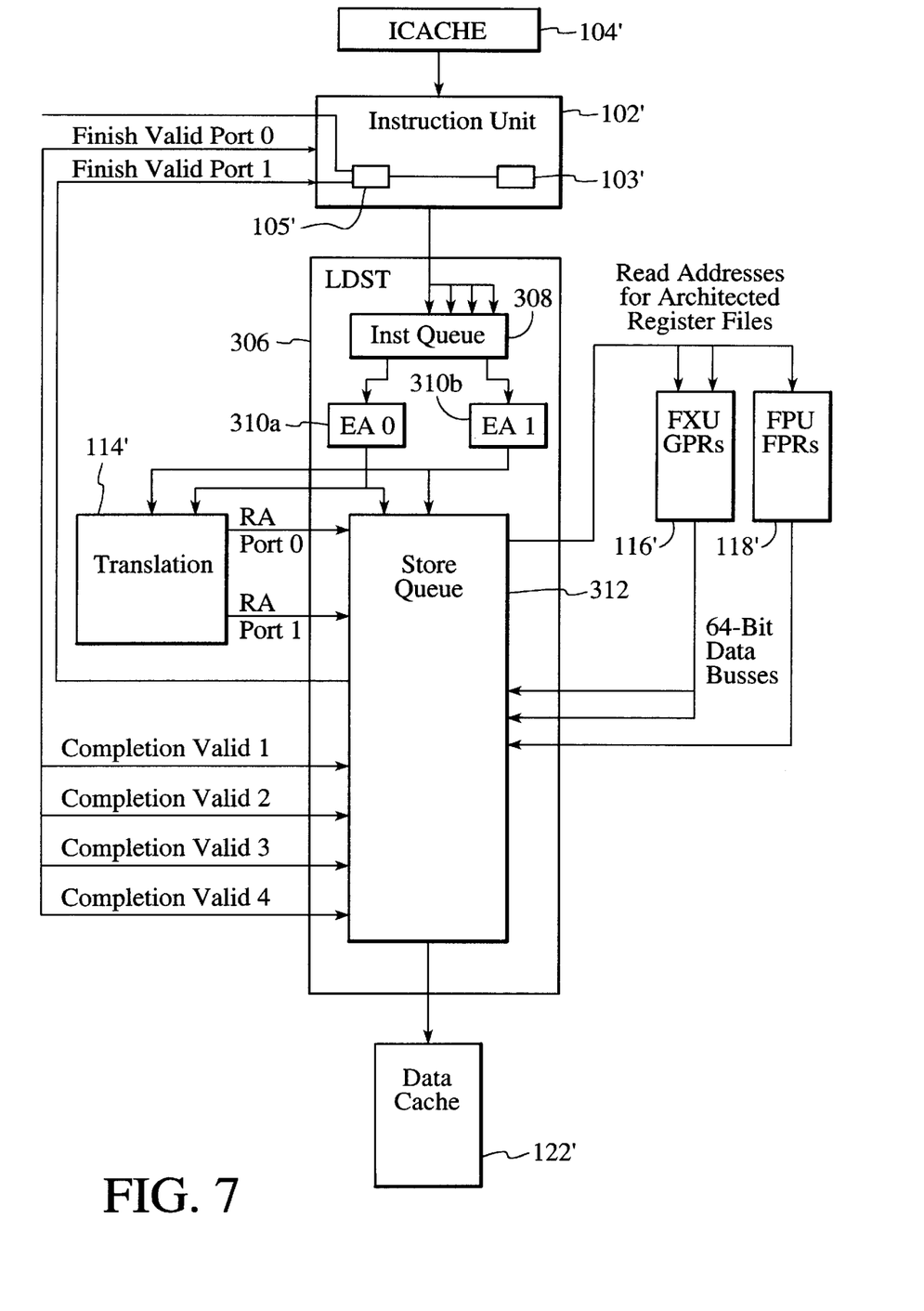
FIG. 7 is a diagram that illustrates a second embodiment of the data flow for completing a plurality of store instructions in accordance with the present invention.

FIG. 7 shows the data flow of store instructions of a preferred embodiment of the present invention. This data flow supports up to two instructions per cycle. The elements are similar to that of FIG. 5. The common elements have been given similar designations. There are some differences. As is seen, however, there are two EA units 310a and 310b. There are also two ports for FXU 116". Since there are two ports on FXU 116" then the translation unit 114' provides a translation signal for each port and the store queue provides finish valid signals for each port.

Figure 8A:
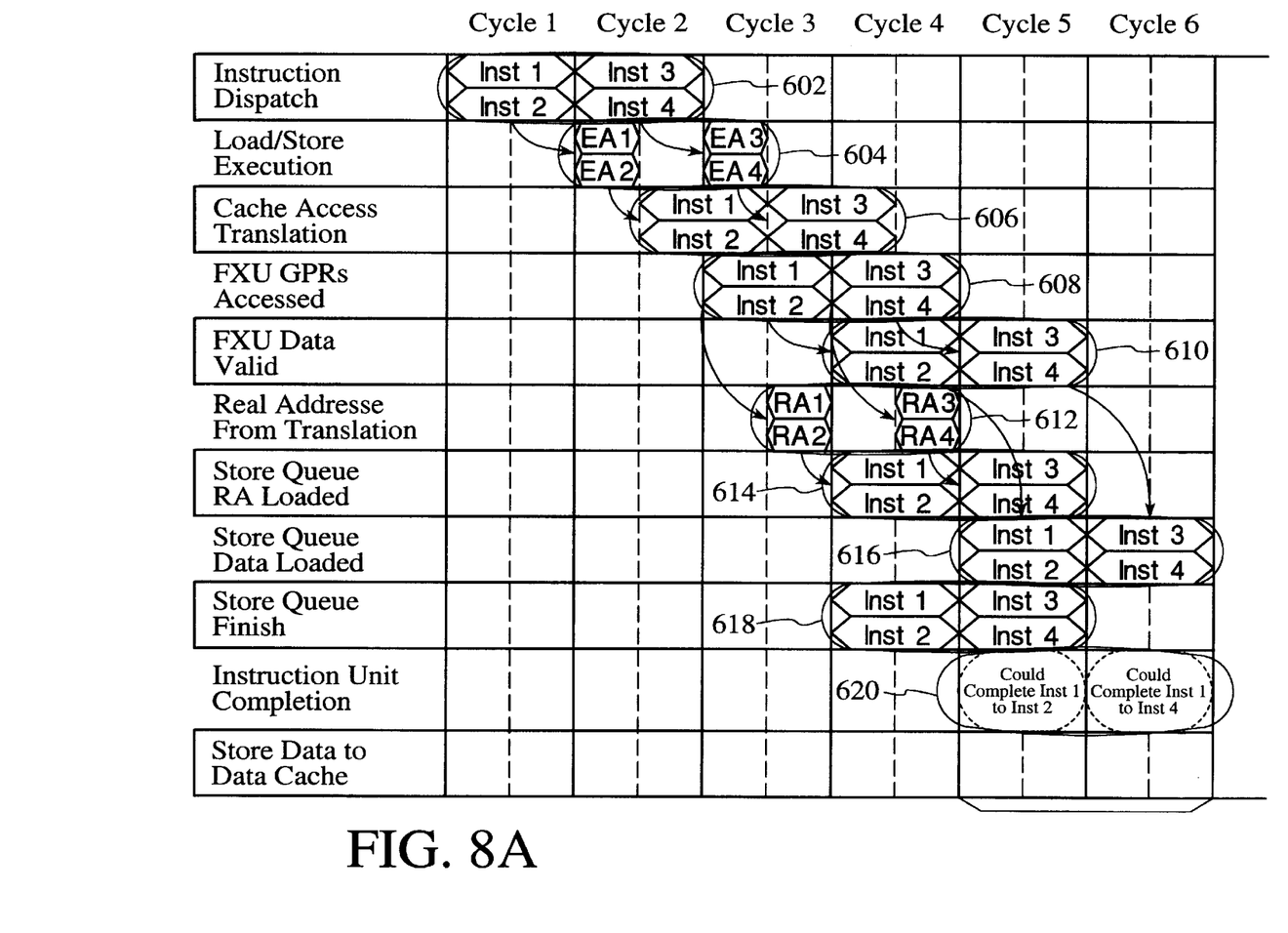
FIG. 8 is a timing diagram which illustrates the operation of the data flow of FIG. 7.
Figure 8B:
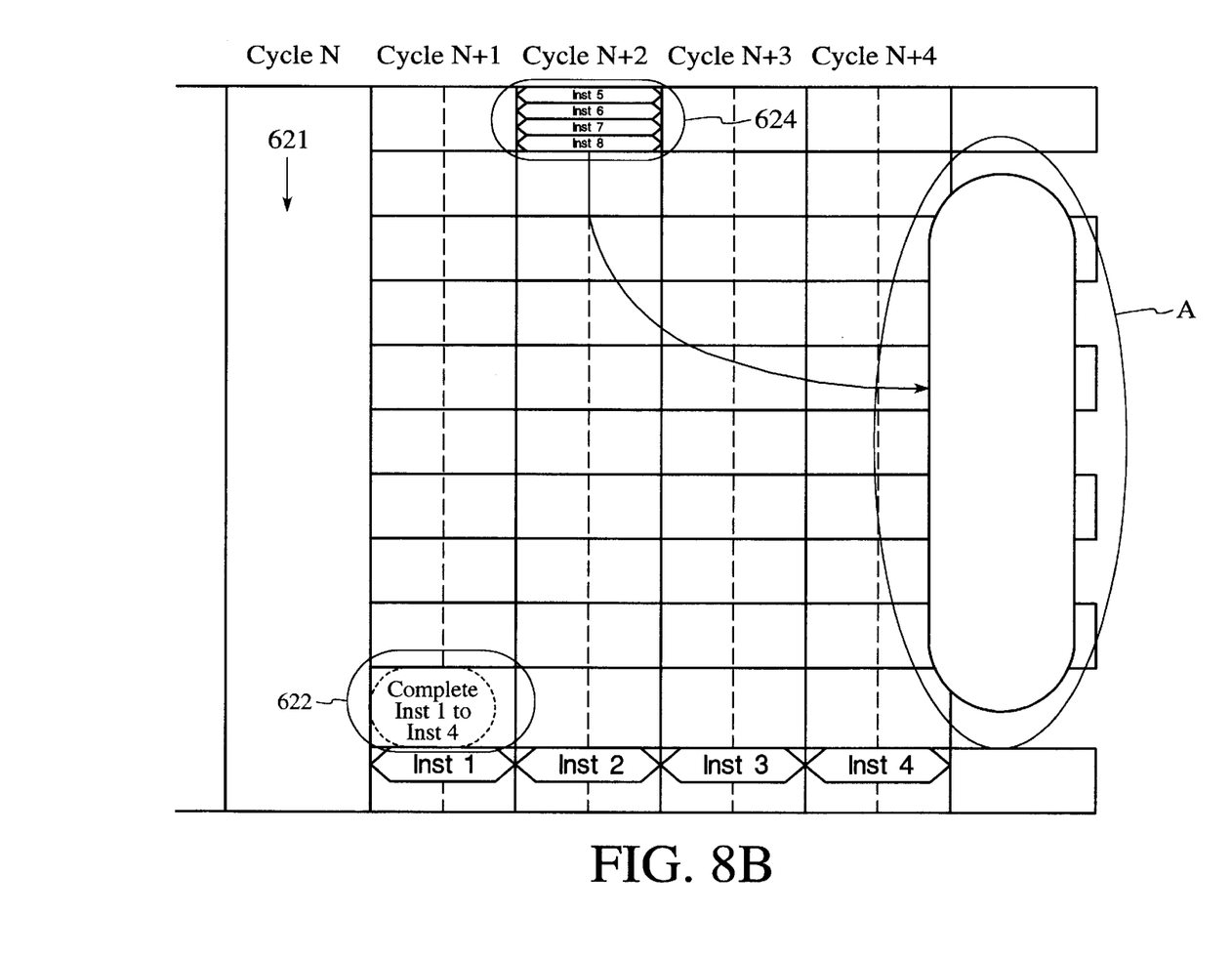

Referring now to FIG. 8, in this embodiment, since two instructions can be handled per cycle, instructions 1 and 2 are dispatched during cycle 1 and instructions 3 and 4 are dispatched during cycle 2, shown generally at 602. Next, load/store generation of EA 1 and EA 2 occurs in the first half of cycle 2 and load/store execution of EA 3 and EA 4 occurs in the first half of cycle 3, shown generally at 604. Next, the cache is accessed for the translated addresses of instructions 1 and 2 between the second half of cycle 2 and the first half of cycle 3, and the cache is accessed for the translated addresses of instructions 3 and 4 occurs between the second half of cycle 3 and the first half of cycle 4, shown generally at 606.

Next, the architected register files (GPRs) are accessed, shown generally at 608. The data for instructions 1 and 2 is accessed at cycle 3, and the data for instructions 3 and 4 is accessed at cycle 4.

Next, the data for real addresses (RA1–RA4) are provided from translation unit and data valid signal for instructions 1–4 is provided to the store queue 312, shown generally at 610 and 612, respectively. In this embodiment, the data valid signal for instructions 1 and 2 is provided during cycle 4 and the data valid signal is provided for instructions 3 and 4 are provided during cycle 5. RA1 and RA2 are provided during the second half of cycle 3, and RA3 and RA4 are provided during the second half of cycle 4.

In this embodiment, the store queue 312' is loaded with real address values for instructions 1–4 during cycles 4 and 5, respectively, shown generally at 614. The store queue finish for each of the instructions 1–4 takes place during the same cycles that the store queue real addresses are loaded, shown generally at 618. Next, the data for instructions 1–4 is loaded into the store queue 312' if it is available, during cycles 5 and 6, respectively, shown generally at 616.

After the stall condition, shown at 621, then the four instructions can be completed simultaneously, shown at 622. The instruction unit then initiates a completion signal for instructions 1–4 during cycles n+1. Also, since all the instructions have been marked as completed, the dispatch unit can dispatch instructions 5–8 at the same time (cycle N+2) shown at 624.

If the processor has reached its limit as to the maximum number of outstanding instructions in cycle N+2 up to 4 instructions can be dispatched, whereas the prior art implementation only one instruction could be dispatched. This saves 3 cycles when instruction 8 is dispatched.

In a system and method in accordance with the present invention, since multiple store instructions are handled together the instructions can be completed together, thereby substantially reducing the number of cycles to complete the store instructions. The bottleneck of a maximum number of instructions that can be dispatched by the instruction unit is alleviated by eliminating the completion queue entries required by the conventional system thereby enabling the instruction unit to dispatch new instructions.

Although the present invention has been described in accordance with the embodiments shown, one of ordinary skill in the art will recognize that there could be variations to the embodiment and those variations would be within the spirit and scope of the present invention. Therefore, although the present invention was described in terms of completing four store instructions at a time, one of ordinary skill in the art readily recognizes, that any number of store instructions can be completed and they would be within the spirit and scope of the present invention. Accordingly, many modifications may be made by one of ordinary skill without departing from the spirit and scope of the present invention, the scope of which is defined by the following claims.

What is claimed is:

1. A load store unit for handling multiple store instruction completions in a processing system after a stall condition, the processing system including an instruction unit, the instruction unit including a dispatch unit and a completion unit, a translation unit and at least one execution unit; the load store unit comprising:

an instruction queue for receiving a plurality of instructions from the dispatch unit;

at least one effective address (EA) unit for receiving the plurality of instructions from the instruction queue; and a store queue, the store queue coupled to the translation unit, the at least one execution unit and the at least one EA unit, the store queue for receiving data and real address information relating to each of the plurality of instructions from the at least one execution unit prior to completion of each of the plurality of instructions, wherein the multiple store instruction completions are handled substantially simultaneously.

2. The system of claim 1 wherein a plurality of instructions are dispatched per cycle.

3. The system of claim 1 wherein one instruction is dispatched per cycle.

4. The system of claim 2 wherein the at least one EA unit comprises two EA units.

5. The system of claim 4 wherein the instruction unit completes the plurality of instructions within the completion window of the instruction unit.

6. A processing system for enabling multiple store instruction completions comprising:

an instruction unit;

a translation unit;

at least one execution unit;

a load/store unit coupled to the instruction unit, translation unit and at least one execution unit, the load store unit including:

an instruction queue for receiving a plurality of instructions from the dispatch unit;

at least one effective address (EA) unit for receiving the plurality of instructions from the instruction queue; and a store queue, the store queue coupled to the translation unit, the at least one execution unit and the at least one EA unit, the store queue for receiving data and real address information relating to each of the plurality of instructions from the at least one execution unit prior to completion of each of the plurality of instructions, wherein the multiple store instruction completions are handled substantially simultaneously.

7. The system of claim 6 wherein a plurality of instructions are dispatched per cycle.

8. The system of claim 6 wherein one instruction is dispatched per cycle.

9. The system of claim 7 wherein the at least one EA unit comprises two EA units.

10. The system of claim 9 wherein the instruction unit completes the plurality of instructions within the completion window of the instruction unit.

* * * * *